United States Patent
Aravamudhan et al.

(10) Patent No.: US 10,448,449 B2
(45) Date of Patent: Oct. 15, 2019

(54) METHODS, SYSTEMS, AND COMPUTER READABLE MEDIA FOR DYNAMICALLY PROVISIONING SESSION TIMEOUT INFORMATION IN A COMMUNICATIONS NETWORK

(71) Applicant: Oracle International Corporation, Redwood Shores, CA (US)

(72) Inventors: Venkatesh Aravamudhan, Bangalore (IN); Raghuvamshi vasudev Singh Thakur, Bangalore (IN); Nitin Gupta, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 87 days.

(21) Appl. No.: 15/649,627

(22) Filed: Jul. 13, 2017

(65) Prior Publication Data
US 2019/0021121 A1    Jan. 17, 2019

(51) Int. Cl.
*H04W 76/38* (2018.01)
*H04W 28/22* (2009.01)
(Continued)

(52) U.S. Cl.
CPC .......... *H04W 76/38* (2018.02); *H04L 12/14* (2013.01); *H04L 12/1407* (2013.01);
(Continued)

(58) Field of Classification Search
None
See application file for complete search history.

(56) References Cited

U.S. PATENT DOCUMENTS 9,432,150 B2    8/2016  Jain et al.
9,467,508 B2   10/2016  Xu
(Continued)

FOREIGN PATENT DOCUMENTS

EP    3 018 946 A1    5/2016
WO   WO 2016/156549 A1   10/2016
(Continued)

OTHER PUBLICATIONS

Notice of Allowance and Fee(s) Due for U.S. Appl. No. 15/804,974 (dated Nov. 13, 2018).
(Continued)

*Primary Examiner* — Saumit Shah
(74) *Attorney, Agent, or Firm* — Jenkins, Wilson, Taylor & Hunt P.A.

(57) ABSTRACT

Methods, systems, and computer readable media for dynamically provisioning subscriber based session timeout information are disclosed. One method includes method includes receiving, from a packet data network gateway (PGW), a request message containing session information parameters corresponding to a session requested by a user equipment device and deriving an absolute timeout period value and an idle timeout period value based on input comprising one or more of the session information parameters. The method further includes generating a response message containing the determined absolute timeout period value and the determined idle timeout period value and sending the generated response message to the PGW, wherein the PGW is configured to apply the absolute timeout period value and the idle timeout period value to the session requested by the user equipment device.

17 Claims, 6 Drawing Sheets

(51) Int. Cl.
*H04L 12/14* (2006.01)
*H04M 15/00* (2006.01)
*H04W 76/12* (2018.01)

(52) U.S. Cl.
CPC ....... *H04M 15/66* (2013.01); *H04M 15/8228* (2013.01); *H04W 28/22* (2013.01); *H04W 76/12* (2018.02)

(56) References Cited

U.S. PATENT DOCUMENTS

| | | | |
|---|---|---|---|
| 9,621,450 | B2 | 4/2017 | Jeong et al. |
| 10,313,883 | B2 | 6/2019 | Krishan |
| 10,334,419 | B2 | 6/2019 | Aravamudhan et al. |
| 2012/0207113 | A1 | 8/2012 | Yoon et al. |
| 2013/0044596 | A1 | 2/2013 | Zhi et al. |
| 2013/0080782 | A1 | 3/2013 | Rajadurai et al. |
| 2013/0272247 | A1 | 10/2013 | Guo |
| 2013/0336305 | A1 | 12/2013 | Yan et al. |
| 2014/0078968 | A1 | 3/2014 | Korhonen et al. |
| 2014/0086214 | A1 | 3/2014 | Hong et al. |
| 2014/0089442 | A1 | 3/2014 | Kim et al. |
| 2014/0153391 | A1* | 6/2014 | Ludwig ............... H04L 41/0816 370/230 |
| 2014/0334386 | A1 | 11/2014 | Fukumasa et al. |
| 2014/0376426 | A1 | 12/2014 | Boudreau et al. |
| 2014/0376454 | A1 | 12/2014 | Boudreau et al. |
| 2015/0036591 | A1 | 2/2015 | Cao et al. |
| 2015/0055459 | A1 | 2/2015 | Wong et al. |
| 2015/0067328 | A1 | 3/2015 | Yin |
| 2015/0111574 | A1 | 4/2015 | Fukumasa et al. |
| 2015/0256440 | A1* | 9/2015 | Jeong ..................... H04L 67/141 370/329 |
| 2015/0319172 | A1 | 11/2015 | Zhang et al. |
| 2016/0007138 | A1 | 1/2016 | Palanisamy et al. |
| 2016/0007170 | A1 | 1/2016 | Vaidya et al. |
| 2016/0085594 | A1 | 3/2016 | Wang et al. |
| 2016/0142860 | A1 | 5/2016 | Kim et al. |
| 2016/0277243 | A1 | 9/2016 | Kim et al. |
| 2016/0277530 | A1 | 9/2016 | Jung et al. |
| 2016/0337127 | A1 | 11/2016 | Schultz et al. |
| 2016/0337841 | A1 | 11/2016 | Won et al. |
| 2017/0126512 | A1 | 5/2017 | Seed et al. |
| 2017/0295557 | A1 | 10/2017 | Chamarty et al. |
| 2017/0318570 | A1 | 11/2017 | Shaw et al. |
| 2017/0347283 | A1 | 11/2017 | Kodaypak |
| 2018/0035351 | A1 | 2/2018 | Kodaypak |
| 2018/0092133 | A1 | 3/2018 | Starsinic et al. |
| 2018/0109941 | A1 | 4/2018 | Jain et al. |
| 2018/0124544 | A1 | 5/2018 | Gupta et al. |
| 2018/0234291 | A1 | 8/2018 | Mathison et al. |
| 2018/0241615 | A1* | 8/2018 | Livanos ............... H04L 41/0668 |
| 2018/0248711 | A1 | 8/2018 | McCann |
| 2018/0249281 | A1 | 8/2018 | McCann |
| 2018/0249282 | A1 | 8/2018 | McCann |
| 2018/0263013 | A1 | 9/2018 | Jain et al. |
| 2019/0058962 | A1 | 2/2019 | Aravamudhan et al. |
| 2019/0141527 | A1 | 5/2019 | Krishan |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |
| WO | WO 2019/014505 | 1/2019 |
| WO | WO 2019/090270 A1 | 5/2019 |

OTHER PUBLICATIONS

Commonly-assigned, co-pending U.S. Appl. No. 15/804,974 for "Methods, Systems, and Computer Readable Media for using Authentication Validation Time Periods," (Unpublished filed Nov. 6, 2017).

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).

Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).

"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).

"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).

"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).

"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).

"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).

"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2015).

"Digital cellular telecommunications system (Phase 2+) (GSM); Universal Mobile Telecommunications System (UMTS); LTE; Architecture enhancements to facilitate communications with packet data networks and applications (3GPP TS 23.682 V13.4.0 Release 13)," ETSI TS 123 682 V13.4.0, pp. 1-82 (Mar. 2016).

"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).

Non-Final Office Action for U.S. Appl. No. 15/679,124 (dated Oct. 4, 2018).

Non-Final Office Action for U.S. Appl. No. 15/604,132 (dated Oct. 2, 2018).

Non-Final Office Action for U.S. Appl. No. 15/499,847 (dated Oct. 2, 2018).

Commonly-assigned, co-pending U.S. Appl. No. 16/121,203 for "Methods, Systems and Computer Readable Media for Overload and Flow Control at a Service Capability Exposure Function (SCEF)," (Unpublished, filed Sep. 4, 2018).

Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).

"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).

Commonly-assigned, co-pending U.S. Appl. No. 15/990,196 for "Methods, Systems, and Computer Readable Media for Detecting and Mitigating Effects of Abnormal Behavior of a Machine Type Commumcation (MTC) Device," (Unpublished, filed May 25, 2018).

(56) References Cited

OTHER PUBLICATIONS

"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).
"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
Donovan, "Diameter Routing Message Priority," RFC 7944, pp. 1-18 (Aug. 2016).
Commonly-assigned, co-pending U.S. Appl. No. 15/604,132 for "Methods, Systems and Computer Readable Media for Providing Integrated Service Capability Exposure Function (SCEF), Service Capability Server (SCS) and Application Server (AS) Services," (Unpublished filed May 24, 2017).
"LTE;General Packet Radio Service (GPRS) enhancements for Evolved Universal Terrestrial Radio Access Network (E-UTRAN) access (3GPP TS 23.401 version 14.3.0 Release 14)," ETSI TS 123 401 V14.3.0, pp. 1-392 (May 2017).
Commonly-assigned, co-pending U.S. Appl. No. 15/499,847 for "Methods, Systems and Computer Readable Media for Providing Service Capability Exposure Function (SCEF) as a Diameter Routing Agent (DRA) Feature," (Unpublished, filed Apr. 27, 2017).
Commonly-assigned, co-pending U.S. Appl. No. 15/608,595 for "Methods, Systems and Computer Readable Media for Providing Service Capability Exposure Function (SCEF) as a Cloud Service," (Unpublished, filed May 30, 2017).
"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).
Abu-Lebdeh et al., "A Virtual Network PaaS for 3GPP 4G and Beyond Core Network Services," pp. 1-7 (Aug. 20, 2016).
"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).

Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
Notification of Transmittal of the International Search Report and the Written Opinion of the International Searching Authority, or the Declaration for International Application Serial No. PCT/US2018/041911 (dated Oct. 12, 2018).
Non-Final Office Action for U.S. Appl. No. 15/804,974 (dated May 10, 2018).
Notification of Transmittal of the International Search Report and the Written Opinion of the International Searching Authority, or the Declaration for International Application No. PCT/US2018/016044 (dated Apr. 24, 2018).
Notification of Transmittal of the International Search Report and the Written Opinion of the International Searching Authority, or the Declaration for International Application No. PCT/US2018/016047 (dated Apr. 24, 2018).
Notification of Transmittal of the International Search Report and the Written Opinion of the International Searching Authority, or the Declaration for International Application No. PCT/US2018/016045 (dated Apr. 24, 2018).
"Change Request," InterDigital, Meeting ARC#25, Doc# ARC-2016-0439-TS-0026_sec5_sec6.1, pp. 1-16 (Oct. 17, 2016).
"Universal Mobile Telecommunications System (UMTS); LTE; Home Subscriber Server (HSS) diameter interfaces for interworking with packet data networks and applications (3GPP TS 29.339 version 13.3.0 Release 13)," , ETSI TS 129 336 V13.3.0, pp. 1-56 (Apr. 2016).
"Routing Non-IP Data to/from Multiple UE Applicatons and Multiple SCS/AS's," Convida Wireless, 3FPP TSG-SA WG2 #113AH, pp. 1-6 (Feb. 2016).
Non-Final Office Action for U.S. Appl. No. 15/608,595 (dated Jan. 8, 2019).
Applicant-Initiated Interview Summary for U.S. Appl. No. 15/499,847 (dated Jan. 22, 2019).
Applicant-Initiated Interview Summary for U.S. Appl. No. 15/604,132 (dated Jan. 22, 2019).
Notification of Transmittal of the International Search Report and the Written Opinion of the International Searching Authority, or the Declaration for International Application Serial No. PCT/US2018/059282 (dated Feb. 11, 2018).
Notice of Allowance and Fee(s) Due for U.S. Appl. No. 15/679,124 (dated Feb. 12, 2019).
"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).
Final Office Action for U.S. Appl. No. 15/608,595 (dated Apr. 29, 2019).
Applicant-Initiated Interview Summary for U.S. Appl. No. 15/608,595 (dated Apr. 22, 2019).
Notice of Allowance and Fee(s) Due for U.S. Appl. No. 15/499,847 (dated Apr. 17, 2019).
Final Office Action for U.S. Appl. No. 15/604,132 (dated Apr. 16, 2019).
Notice of Allowance and Fee(s) Due and AFCP 2.0 Decision for U.S. Appl. No. 15/604,132 (dated Aug. 8, 2019).

* cited by examiner

| Congestion Level | Timeout Period Values (sec) |
|---|---|
| 1 (Low) | ATV: 300, ITV: 180 |
| 2 (Low Medium) | ATV: 280, ITV: 120 |
| 3 (Medium) | ATV: 250, ITV: 80 |
| 4 (High Medium) | ATV: 120, ITV: 60 |
| 5 (High) | ATV: 100, ITV: 45 |

401

| ULI | APN | ToD | Timeout Period Values (sec) |
|---|---|---|---|
| 82 0000a11 | three.co.uk | 6am-6:59am | ATV: 300, ITV: 180 |
| 82 0000a11 | basker.com | 7am-7:59am | ATV: 280, ITV: 120 |
| 94 0000a13 | cs.wunc.edu | 8am-8:59am | ATV: 250, ITV: 80 |
| 94 0000a13 | cs.wunc.edu | 9am-9:59am | ATV: 120, ITV: 60 |
| 94 0000a13 | throttle.com | 10am-10:59am | ATV: 100, ITV: 45 |

402

| ULI | ToD | Timeout Period Values (sec) |
|---|---|---|
| 82 0000a11 | 6am-6:59am | ATV: 300, ITV: 180 |
| 82 0000a11 | 7am-7:59am | ATV: 280, ITV: 120 |
| 94 0000a13 | 8am-8:59am | ATV: 250, ITV: 80 |
| 94 0000a13 | 9am-9:59am | ATV: 120, ITV: 60 |
| 94 0000a13 | 10am-10:59am | ATV: 100, ITV: 45 |

403

| ULI | APN | Timeout Period Values (sec) |
|---|---|---|
| 82 0000a11 | three.co.uk | ATV: 300, ITV: 180 |
| 82 0000a11 | basker.com | ATV: 280, ITV: 120 |
| 94 0000a13 | cs.wunc.edu | ATV: 250, ITV: 80 |
| 94 0000a13 | cs.wunc.edu | ATV: 120, ITV: 60 |
| 94 0000a13 | throttle.com | ATV: 100, ITV: 45 |

404

| ToD | APN | Timeout Period Values (sec) |
|---|---|---|
| 6am-6:59am | three.co.uk | ATV: 300, ITV: 180 |
| 7am-7:59am | basker.com | ATV: 280, ITV: 120 |
| 8am-8:59am | cs.wunc.edu | ATV: 250, ITV: 80 |
| 9am-9:59am | cs.wunc.edu | ATV: 120, ITV: 60 |
| 10am-10:59am | throttle.com | ATV: 100, ITV: 45 |

| ToD | Timeout Period Values (sec) |
|---|---|
| 6am-6:59am | ATV: 300, ITV: 180 |
| 7am-7:59am | ATV: 280, ITV: 120 |
| 8am-8:59am | ATV: 250, ITV: 80 |
| 9am-9:59am | ATV: 120, ITV: 60 |
| 10am-10:59am | ATV: 100, ITV: 45 |

406

| ToD Characteristics | ToD Slots | Timeout Period Values (sec) |
|---|---|---|
| Idle | 12am-1am, 1am-2am, 3am-4am, 4am-5am | ATV: 300, ITV: 150 |
| Medium Idle | 5am-6am, 6am-7am, 2pm-3pm | ATV: 250, ITV: 100 |
| Busy | 7am-8am, 1pm-2pm, 3pm-4pm, 7pm-8pm | ATV: 160, ITV: 50 |
| Medium Busy | 8am-9am, 12pm-1pm, 4pm-5pm, 6pm-7pm, 8pm-9pm, 11p-12pm | ATV: 80, ITV: 25 |
| Very Busy | 9am-10am, 10am-11am, 11am-12pm, 5pm-6pm, 9pm-10pm | ATV: 40, ITV: 10 |

407

| ULI | Timeout Period Values (sec) |
|---|---|
| 82 0000a11 | ATV: 300, ITV: 180 |
| 82 0000a11 | ATV: 280, ITV: 120 |
| 94 0000a13 | ATV: 250, ITV: 80 |
| 94 0000a13 | ATV: 200, ITV: 60 |
| 94 0000a13 | ATV: 100, ITV: 45 |

408

| APN | Timeout Period Values (sec) |
|---|---|
| three.co.uk | ATV: 300, ITV: 180 |
| basker.com | ATV: 280, ITV: 120 |
| cs.wunc.edu | ATV: 250, ITV: 80 |
| cs.wunc.edu | ATV: 120, ITV: 60 |
| throttle.com | ATV: 100, ITV: 45 |

METHODS, SYSTEMS, AND COMPUTER READABLE MEDIA FOR DYNAMICALLY PROVISIONING SESSION TIMEOUT INFORMATION IN A COMMUNICATIONS NETWORK

TECHNICAL FIELD

The subject matter described herein relates to methods and systems for managing resources within a long term evolution (LTE) communications network. More particularly, the subject matter described herein relates to methods, systems, and computer readable media for dynamically provisioning session timeout information in a communications network.

BACKGROUND

Current mobile networks are witnessing a surge in the number of user devices, such as Internet of things (IoT) devices and machine-to-machine (M2M) devices, communicating smaller portions of data through evolved packet core (EPC) networks. Through EPCs, network operators are able to provide subscribers with a variety of data access services, voice over LTE (VoLTE) services, and other real-time media services. As of the number of subscribers and devices continue to increase, network operators will be compelled to prioritize and allocate resources for the different types of real media services. One measure that is used to assist with maintaining and managing resources is the use of a timeout configuration at the packet data network gateway (PGW). In particular, a PGW may utilize a predefined absolute timeout value and a predefined idle timeout value as duration thresholds for terminating unused sessions. Notably, these timeout values are static values that are typically configured and established at the PGW node by the network operator. While the utilization of static timeout values during normal traffic conditions when resource utilization may be more than sufficient, such measures may be inadequate during peak or busy hours.

Accordingly, there is a need for systems and methods for dynamically provisioning session timeout information in a communications network.

SUMMARY

Methods, systems, and computer readable media for dynamically provisioning session timeout information in a communications network are disclosed. In some embodiments, the method includes receiving, from a packet data network gateway (PGW), a request message containing session information parameters corresponding to a session requested by a user equipment device and deriving an absolute timeout period value and an idle timeout period value based on input comprising one or more of the session information parameters. The method further includes generating a response message containing the determined absolute timeout period value and the determined idle timeout period value and sending the generated response message to the PGW, wherein the PGW is configured to apply the absolute timeout period value and the idle timeout period value to the session requested by the user equipment device.

In some embodiments, the system includes a policy and charging rules function (PCRF) node comprising at least one processor, a memory, and a timeout period value determination (TPVD) engine stored in the memory and when executed by the at least one processor of the PCRF is configured to receive a request message containing session information parameters corresponding to a session requested by a user equipment device, derive an absolute timeout period value and an idle timeout period value based on input comprising one or more of the session information parameters, generate a response message containing the determined absolute timeout period value and the determined idle timeout period value. The system further includes a packet data network gateway (PGW) comprising at least one processor, a memory, and a timeout parameter manager stored in the memory and when executed by the at least one processor of the PGW is configured to receive, from the PCRF, the generated response message containing the determined absolute timeout period value and the determined idle timeout period value and to apply the absolute timeout period value and the idle timeout period value to the session requested by the user equipment device.

The subject matter described herein can be implemented in software in combination with hardware and/or firmware. For example, the subject matter described herein can be implemented in software executed by a processor. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'engine', 'manager', or 'function' can refer to software in combination with hardware and/or firmware for implementing features described herein.

BRIEF DESCRIPTION OF THE DRAWINGS

The subject matter described herein will now be explained with reference to the accompanying drawings of which:

FIGS. 4A and 4B depict a plurality of exemplary session information parameter tables containing various timeout period values in accordance with an embodiment of the subject matter described herein.

DETAILED DESCRIPTION

Figure 1:
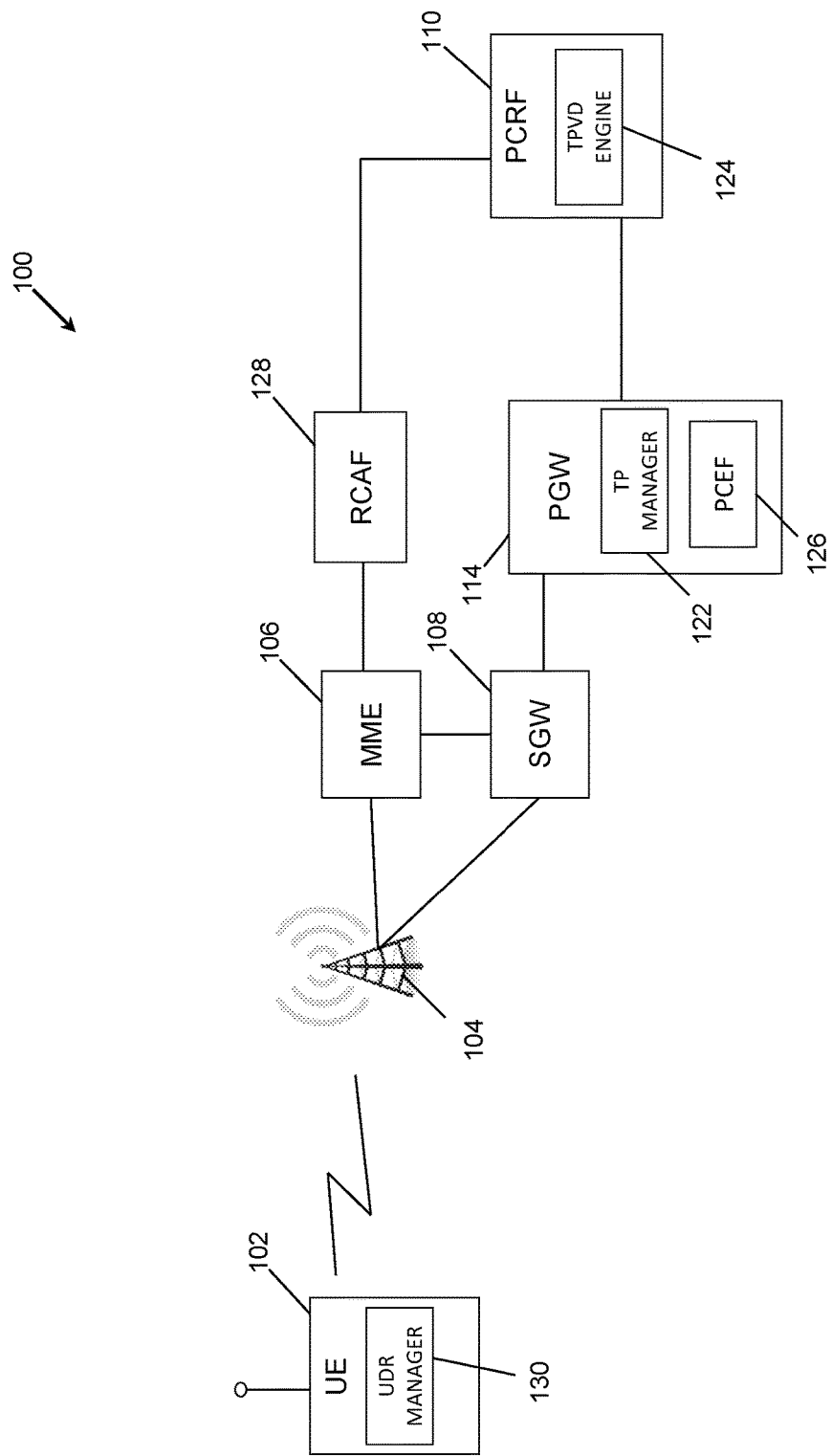
FIG. 1 is a block diagram illustrating an exemplary system configured for dynamically provisioning session timeout information in a communications network in accordance to an embodiment of the subject matter described herein.

The subject matter described herein relates to methods, systems, and computer readable media for dynamically provisioning session timeout information in a communications network. The disclosed subject matter describes methods, systems, and computer readable mediums by which a network element (e.g., a policy and charging rules function (PCRF)) may execute an algorithm that enables the network element to dynamically determine and provision an absolute timeout period value and idle timeout period value on a packet data network gateway (PGW), or another network resource node (e.g., a mobile management entity (MME) node). As indicated above, a PGW currently utilizes a predefined static timeout configuration that defines both an absolute timeout value and idle timeout value. Each of these timeout values are typically configured at the PGW once (e.g., at the time the network element is introduced into the network) as a static value by a network operator. Notably, the present static timeout configuration method does not consider or utilize other parameters, such as time of day (ToD) parameters, user location information (ULI) parameters, or network congestion. For example, the local timeout configuration in a PGW may indicate that an absolute timeout value of 300 seconds and an idle timeout value of 180 seconds will be utilized for any session established with a particular M2M access point name (APN) node. Notably, the timeout values specify the time limits in which an M2M client device (e.g., a water meter device with wireless communications capability, electricity meter device with wireless communications capability, a street light with wireless communications capability, a telemetry device with wireless communications capability, etc.) must send data to the designated M2M based server (e.g., a water meter services server, an electricity meter services server, etc.) before the session is terminated by the PGW. While the utilization of static timeout values during normal traffic conditions when resource utilization may be more than sufficient, such measures may be inadequate during peak or busy hours. For example while considering the example above, during a busy hour traffic period, sessions to the M2M server may be controlled more effectively if the absolute timeout period can be reduced to 120 seconds and if the idle timeout period can be reduced to 60 seconds.

In some embodiments, this notion may be implemented by configuring a PCRF to receive session information parameters provided by a PGW (that hosts a policy and charging enforcement function (PCEF)) during the session establishment procedure. The session information parameters are subsequently utilized by a timeout period value determination (TPVD) engine hosted by the PCRF to derive the timeout period values. Notably, the TPVD engine uses the session information parameters as input and is able to derive the absolute and idle timeout values pertaining to the particular session between the user equipment device and the destination server (e.g., session requested by the PGW). Once the TPVD engine processes the session information parameters and determines the absolute and idle timeout values, the PCRF may provide the derived timeout period values to PGW via a response message. Once received by the PGW, the timeout period values may be adopted and/or replace the default timeout values previously configured on the PGW. Consequently, unused or faulty communication sessions may be terminated or deleted by the PGW more quickly, thereby conserving network resources more efficiently.

Reference will now be made in detail to various embodiments of the subject matter described herein, examples of which are illustrated in the accompanying drawings. Wherever possible, the same reference numbers will be used throughout the drawings to refer to the same or like parts. FIG. 1 is a block diagram illustrating an example communications environment 100 that includes one or more nodes associated with a fourth generation (4G) network, a long term evolution (LTE) network, an Internet protocol (IP) Multimedia Core Network Subsystem (IMS) network, a LTE-advanced network, and/or an evolved packet core (EPC) network. For example, FIG. 1 includes a wireless user equipment (UE) device 102, such as a wireless mobile device (e.g., a smart phone), a tablet computing platform device, an Internet of things (IoT) device, a machine-to-machine (M2M) device, or any other device that is capable of wirelessly communicating with an eNodeB 104 via 4G, LTE, or some other wireless access protocol. In some embodiments, user equipment device 102 may be configured to wirelessly connect with eNodeB 104 in order to facilitate communication with an external network, such as the Internet and/or an IMS network.

Communications environment 100 may also include various network nodes that compose an evolved packet system (EPS) network, such as a mobility management entity (MME) 106, a serving gateway (SGW) 108, a packet data network gateway (PGW) 114, a policy and charging rules function (PCRF) node 110, a radio access network congestion awareness function (RCAF) node 128, and the like. In some embodiments, communications environment 100 and/or its related nodes may be configured to handle and facilitate multimedia services (e.g., Internet access, VoIP call sessions, VoLTE call sessions, M2M sessions, etc.) via established Internet protocol (IP) based data sessions requested by a user equipment device.

In some embodiments, user equipment device 102 may communicate with PGW 114 via an access network, which may represent a radio access network (RAN) and may include various nodes for communicating with user equipment device 102 and elements within communications environment 100. Exemplary nodes in the access network may include eNodeB 104, which may perform radio access functions. The access network, or nodes therein, may be used for communications between user equipment device 102 and the nodes in the communications environment 100. For example, eNodeB 104 or some other node (e.g., MME 106, SGW 108, etc.) may communicate UE-related messages (e.g., authentication, attachment requests, mobility related messages, session setup requests, etc.) to various nodes in communications environment 100.

In some embodiments, eNodeB 104 is configured to forward communications (e.g., session setup request messages, attachment request messages, etc.), such as radio resource control (RRC) connection request messages, that are received from user equipment device 102 and directed to MME 106. MME 106 is the primary control node for the radio access network (e.g., an LTE access network) and is responsible for assisting with bearer activation/deactivation processing as well as selecting a SGW (e.g., SOW 108) and PGW (e.g., PGW 114) for user equipment device 102 at the initial attachment stage. Further, MME 106 is configured to generate create session request messages in response to receiving corresponding attachment request messages or session setup request messages originating from user equipment device 102 and/or eNodeB 104. After generating the creation request message, MME 106 may be configured to direct the message to PGW 114 via SGW 108 (e.g., via S11 and S5 GPRS tunneling protocol (GTP) interfaces). In some embodiments, MME 106 is also configured to receive radio user plane congestion information (e.g., RAN congestion information) determined by eNodeB 104. MME 106 may then subsequently provide the radio user plane congestion information received from by eNodeB 104 to RCAF node 128 using a RAN operation and management system (e.g., using Nq interfaces and/or application protocol).

In some embodiments, SGW 108 represents a node or gateway for facilitating communications between the access network/eNodeB and other nodes (e.g., PGW 114) or networks. In some embodiments, SGW 108 may communicate user traffic to other nodes in communications environment 100.

In some examples, PGW 114 may be any suitable entity for providing access and supporting sessions to the Internet, an IMS network, an application function/server, and/or other data networks. In some embodiments, PGW 114 may be configured to host PCEF 126 that is stored in memory and executed by a processor of PGW 114. PCEF 126 may be configured to obtain a number of different session information parameters corresponding to a session being requested by user equipment device 102. For example, the session information parameters obtained by PCEF 126 may include ToD information (e.g., 3GPP-MS-Timezone-AVP), APN information (e.g., Called-Station-ID-AVP), ULI information (e.g., 3GPP-User-Location-Information AVP), and radio access technology (RAT) type information. After receiving a create session request message from MME 106, PGW 114 and/or PCEF 126 may be configured to generate and send a Diameter request message (e.g., a CCR-I request message) containing the session information parameters to PCRF 110. In some embodiments, PCEF 126 is also configured to manage and enforce policy and charging control (PCC) rules provided by a PCRF (e.g., PCRF 110). For example, PCC rules may be provided for each session or service data flow (e.g., one or more packet flows that match certain criteria, such as a subscriber-based media traffic flow) and/or user equipment device 102 attempting to use PGW 114.

In some embodiments, PGW 114 also includes timeout period manager 122 that may comprise a software component that is stored in memory and executed by a processor of PGW 114. TP manager 122 may be configured to manage and modify the local configuration (e.g., a local configuration file) of absolute and idle timeout values of PGW 114. As will be discussed in greater detail below, TP manager 122 may be provisioned by a PCRF (e.g., PCRF 110) with absolute and idle timeout period values that define when a particular session is to be deleted in response to detecting when a user equipment device fails to conduct packet communications (e.g., such that messages sent from the user equipment device 102 to an application server have ceased) for a specified period of time or, alternatively, when the total session duration exceeds a specified period of time. After receiving the absolute and idle timeout values from the PCRF, TP manager 122 is responsible for modifying the local timeout configuration by replacing the default and/or predefined static timeout period values with the newly received absolute and idle timeout period values. Further, TP manager 122 and/or PGW 114 is configured to monitor the requested session to determine if the traffic communicated from the user equipment to the application server ceases. If the time duration in which there is no packet traffic being sent over the session from the user equipment to the application server reaches or exceeds the idle timeout period value, then TP manager 122 is configured to delete or terminate the session. Similarly, TP manager 122 may cancel or terminate the session between the user equipment device and the application server if the TP manager 122 and/or PGW 114 detects that the session duration has reached or exceeded the absolute timeout period value.

As used herein, PCRF node (e.g., PCRF 110) may be any suitable entity for creating, selecting, or otherwise determining charging rules and/or other policies (e.g., one or more PCC rules) associated with a user subscriber. For example, PCRF 110 may be a stand-alone node, e.g., a policy server, or may be co-located or integrated with one or more nodes in communications environment 100. In some embodiments, PCRF node 110 may include and/or support a timeout period value determination (TPVD) engine 124. TPVD engine 124 may comprise a software component that is stored in memory and executed by a processor of the PCRF 110 (or a host server supporting PCRF 110). For example, TPVD engine 124 in PCRF 110 may extract and/or read session information parameters from a Diameter protocol request message (e.g., CCR-I message) received from PGW 114. In some embodiments, the session information parameters utilized by TPVD engine 124 may include i) time of day data, ii) user location information data, iii) radio access type (RAT) data, and iv) APN identification data (which further indicates the IP data session type). In some embodiments, TPVD engine 124 may also utilize network congestion information provided by RCAF 128.

Once extracted, the session parameter information may be used by TPVD engine 124 to derive the absolute and idle timeout period values for the session requested by the subscriber's use equipment device. In some embodiments, TPVD engine 124 uses the session information parameters as input for an algorithm that derives the absolute and idle timeout period values based on the specific parameters provided. The manner in which the absolute and idle timeout period values are derived is described in greater detail below and in FIG. 3. After determining the absolute and idle timeout period values, TPVD engine 124 is configured to generate a response message (e.g., a CCA-I message) that contains the absolute and idle timeout period values. PCRF 110 is then configured to send the response message containing the absolute and idle timeout period values to PGW 114. PGW 114 and/or TP manager 122 may then extract the absolute and idle timeout period values from the response message and assign the values (e.g., overwriting default or predefined timeout values) to the session being established for the requesting user equipment device 102.

After the timeout period values are received by timeout period manager 122 and/or PGW 114, PGW 114 may be configured to generate a signaling message that includes new absolute and idle timeout period values. For example, PGW 114 can generate a create session response message that is encoded with protocol configuration option (PCO) information elements (IEs) that contains the absolute and idle timeout period values. Notably, the PCO IEs in GTP messaging in the create session response message enable the timeout period manager 122 and/or PGW 114 to provide information to user equipment device 102 transparently. Alternatively, PGW 114 may be configured to select and/or use any other GTP based IE for transferring timeout period value information transparently towards user equipment device 102. In alternate embodiments, the sending of the absolute and idle timeout period values may be transparently sent to user equipment device 102 associated with a UMTS/

HSPA+ based VoLTE subscriber as part of the GTP messaging sent to a gateway GPRS support node (GGSN) or other packet gateway that is utilized in other access technologies.

After receiving the timeout period values provided by timeout period manager 122, user equipment device 102 (e.g., a mobile device, IoT device, M2M device, and the like) utilize an uplink data rate (UDR) manager 130 to extract the absolute and idle timeout period values. In some embodiments, user equipment device 102 and/or UTR manager 130 may be configured to utilize the extracted timeout period values to determine an optimal data transmission method/strategy for sending data over the session to be established. For example, the user equipment device 102 and/or UTR manager 130 may utilize multiple data rates for sending uplink data towards the server based on the timeout period values provided by the PGW and the core network.

Similarly, PGW 114 may be configured to forward the absolute and idle timeout period values to an MME node (e.g., MME 106) in the network. After receiving the timeout information, MME 106 may utilize the timeout period values to help conduct E-RAB/RAB setup procedures by applying the absolute and idle timeout period values at the S1-AP connection layer. In the event the radio access network has sufficient resources during this establishment procedure, the eNodeB 104 may be configured to readjust the absolute and idle timeout period values to normal/predetermined values and update other nodes, such as the MME 106 and PGW 114 using the GTP interface.

After the requested IP data session is established, PGW 114 and/or TP manager 122 will be configured to monitor the session for timeout periods. In some embodiments, manager 122 may be configured to maintain a first timer that keeps track of the time elapsed with respect to the absolute timeout period value. Timeout period manager 122 may also maintain a second timer that keeps track of the time elapsed with respect to the idle timeout period value. For example, timeout period manager 122 may be configured to keep track of the time elapsed from both i) the point in time in which the session is initiated and ii) the point in time in which the user device has communicated a signal or message within the session. In the event TP manager 122 detects that a total amount of elapsed session time reaches or exceeds the absolute timeout period value, then TP manager 122 will be configured to terminate the session. Similarly, in the event TP manager 122 detects that an amount of elapsed time after the last communication made by the user device reaches or exceeds the idle timeout period value, then TP manager 122 will be configured to terminate the session.

It will be appreciated that FIG. 1 and its related description are for illustrative purposes and that each of PGW 114 and PCRF 110 may include additional and/or different modules, components, or functionality. Further, timeout period manager 122, TPVD engine 124, and/or related functionality described herein may be associated with different and/or additional nodes or entities.

Figure 2:
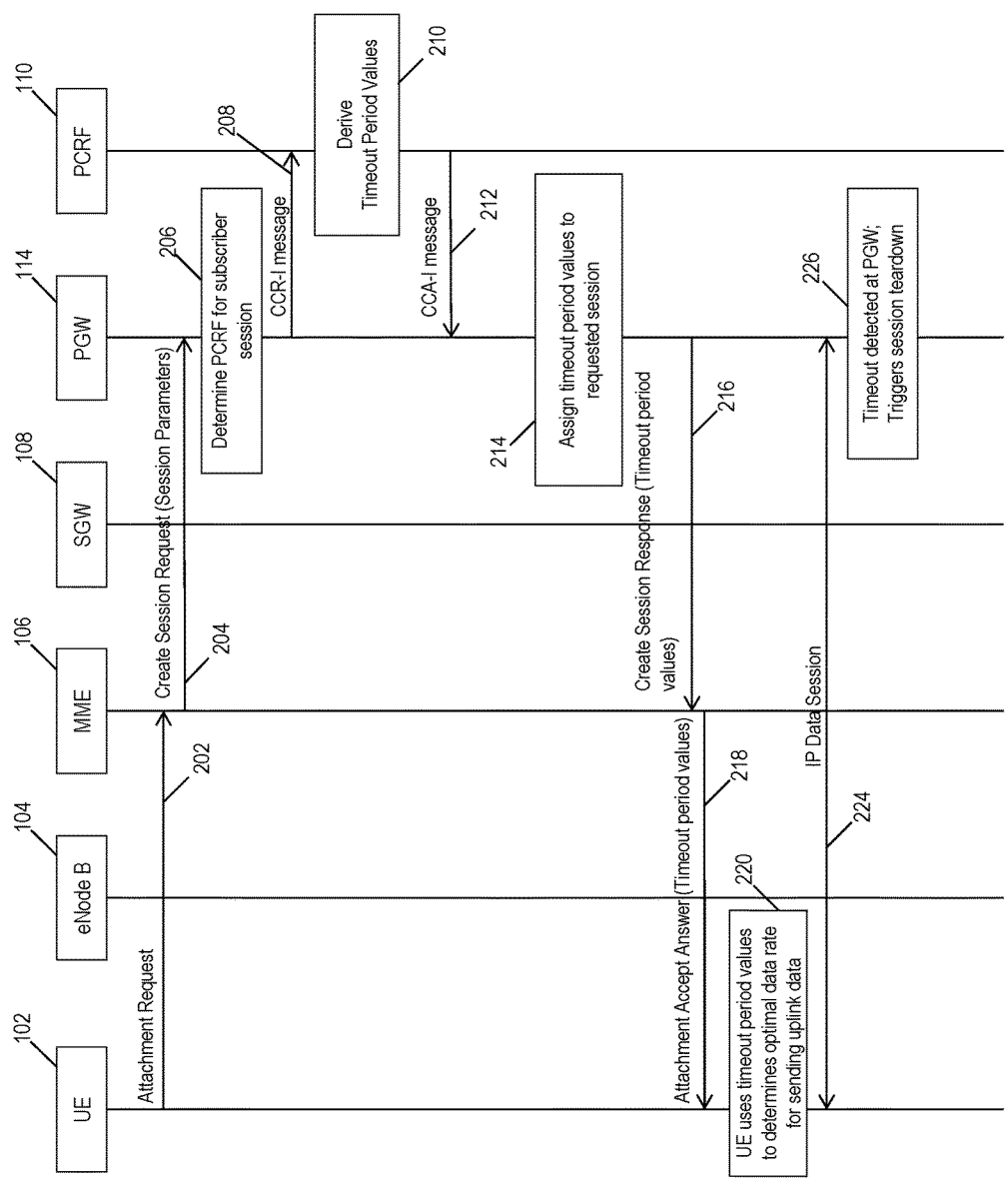
FIG. 2 illustrates a signaling diagram related to the dynamic provisioning session timeout information in a communications network in accordance to an embodiment of the subject matter described herein.

FIG. 2 illustrates a signaling diagram related to the dynamic provisioning session timeout information in a communications network in accordance to an embodiment of the subject matter described herein. For example, a PGW (hosting a PCEF and a timeout period manager as shown in FIG. 1) may generate and send Diameter protocol request messages (e.g., CCR messages) containing session information parameters to a designated PCRF for a session requested by a user equipment device. Such a mechanism and/or method enables the PCRF and PGW to derive absolute and idle timeout period values that can be applied to a session requested by a user equipment device based on the provided session information parameters (e.g., ULI information, ToD information, APN information (which further indicates IP data session type), RAT type information, etc.). Although not shown in FIG. 2, PCRF 110 is further configured to receive radio user plane congestion information from an RCAF that can be used by PCRF 110 to derive the absolute and idle timeout period values.

Referring to FIG. 2, PGW 114 may include functionality for processing various messages. PGW 114 may include one or more communications interface(s) for communication with Diameter protocol entities, e.g., 3rd Generation Partnership Project (3GPP) LTE communications interfaces and other (e.g., non-LTE) communications interfaces. For example, the communications interface(s) may receive or send Diameter protocol signaling messages associated with multiple different Diameter signaling interfaces including, but not limited to, Gx, Gxx, Rx, Sd, Sy, Gy, Ro, and/or S9.

In FIG. 2, user equipment device 102 sends a session setup request message 202 (e.g., an attach request) to an MME 106 via eNodeB 104 in order to request the establishment of a communications session (e.g., an M2M data session). User equipment device 102 (e.g., an M2M device) may facilitate the communication by establishing a radio access session with eNodeB 104 using any wireless protocol, such as LTE. The eNodeB 104 may in turn forward a session setup request message, such as attachment request message 202, to MME 106 via an S1-AP interface link.

After receiving attachment request message 202, MME 106 utilizes APN information contained within the message to generate and send a corresponding create session request message 204. In some embodiments, create session request message 204 may include one or more session information parameters (e.g., ULI information, ToD information, APN information, RAT type information, etc.) and is directed to PGW 114 via SGW 108 by way of S11 and S5 (GTP) interfaces.

After receiving create session request message 204, PGW 114 determines and designates an appropriate PCRF that will be responsible for supporting the subscriber session (block 206). In some examples, PGW 114 may determine and/or designate the appropriate PCRF based on a DNS query, a local policy, or any other available mechanism used by a PGW. For example, PGW 114 may extract and cross-reference the APN included in received create session request message 204 to query a DNS server in order determine a corresponding IP address of the PCRF to be designated. In other embodiments, PGW 114 may be configured to select a PCRF based on the user equipment's phone number, ISDN, IP address, and/or the like. In block 206, PGW 114 also establishes a subscriber Gx session with the identified PCRF (e.g., PCRF 110).

In some embodiments, PGW 114 (using a PCEF and/or timeout period manager) is further configured to send a CCR request message 208 containing the session information parameters to PCRF 110 (which was designated in block 206). In response, a TPVD engine in PCRF 110 may be configured to extract the session information parameters from request message 208 and derive absolute and idle timeout period values (block 210). For example, TPVD engine may use the received session information parameters as input for an algorithm that derives and produces the absolute and idle timeout period values as output (e.g., see FIG. 3 for greater detail).

After the absolute and idle timeout period values are derived by the TPVD engine, PCRF 110 may generate and send a CCA-I message 212 containing the timeout period values to PGW 114. In block 214, PGW 114 (via the timeout period manager) receives and extracts the absolute and idle timeout period values from CCA-I message 212 and subsequently assigns these timeout period values to the session being requested by user equipment device 102. In some instances, PGW 114 may be configured to overwrite the existing (e.g., default or pre-defined) absolute and idle timeout period values stored in a local configuration file with the newly received absolute and idle timeout period values. Notably, PGW 114 will utilize the new absolute and idle timeout period values when monitoring the communications sent from user equipment device 102 once the data session is established.

After PGW 114 has assigned the absolute and idle timeout period values to the requested subscriber session, PGW 114 generates a create session response message 216 that is encoded with a protocol configuration option (PCO) information element (IE) that contains the absolute and idle timeout period values. After generating create session response message 216, PGW 114 directs the message to user equipment device 102 via MME 106 and SGW 108.

In response to receiving create session response message 216 from PGW 114 via SGW 108, MME 106 generates an associated session setup answer message, i.e., attachment accept answer message 218. In some examples, answer message 218 is encoded by MME 116 to include the protocol configuration option (PCO) information element (IE) comprising the absolute and idle timeout period values that were originally included in create session response message 216. MME 116 subsequently sends attachment accept answer message 218 containing the absolute and idle timeout period values to user equipment device 102.

After receiving attach accept answer message 218, user equipment device 102 may conduct a SIP registration process that will initiate establish the requested communications session (e.g., a VoLTE call session, M2M session, IoT data session, etc.). In some embodiments, user equipment device 102 may also be configured to extract the absolute and idle timeout period values from message 218. Notably, after extracting the absolute and idle timeout period values from the received message 218, the user equipment device 102 may execute an uplink data rate (UDR) manager (e.g., UDR manager 130 in FIG. 1) that is configured to use the timeout period values to determine an optimal data transmission method/strategy for sending data over the session being established. Specifically, user equipment device 102 may implement the logic of the UDR manager to decide on a data rate transmission strategy. For example, UDR manager 130 (as shown in FIG. 1) in user equipment device 102 may utilize multiple data rates for sending UL data towards a server based on the timeout period values provided by the PGW and the core network.

After data session 224 is established, PGW 114 is configured to monitor the data session 224. In particular, PGW 114 (and/or TP manager 122 as shown in FIG. 1) may monitor the data and messages sent over data session 224 from user equipment device 102. In the event PGW 114 and/or TP manager 122 detects a timeout condition (e.g., either the absolute timeout period value being exceeded or the idle timeout period value exceeded), then PGW 114 may terminate the communication session by triggering a session teardown (block 226).

Figure 3:
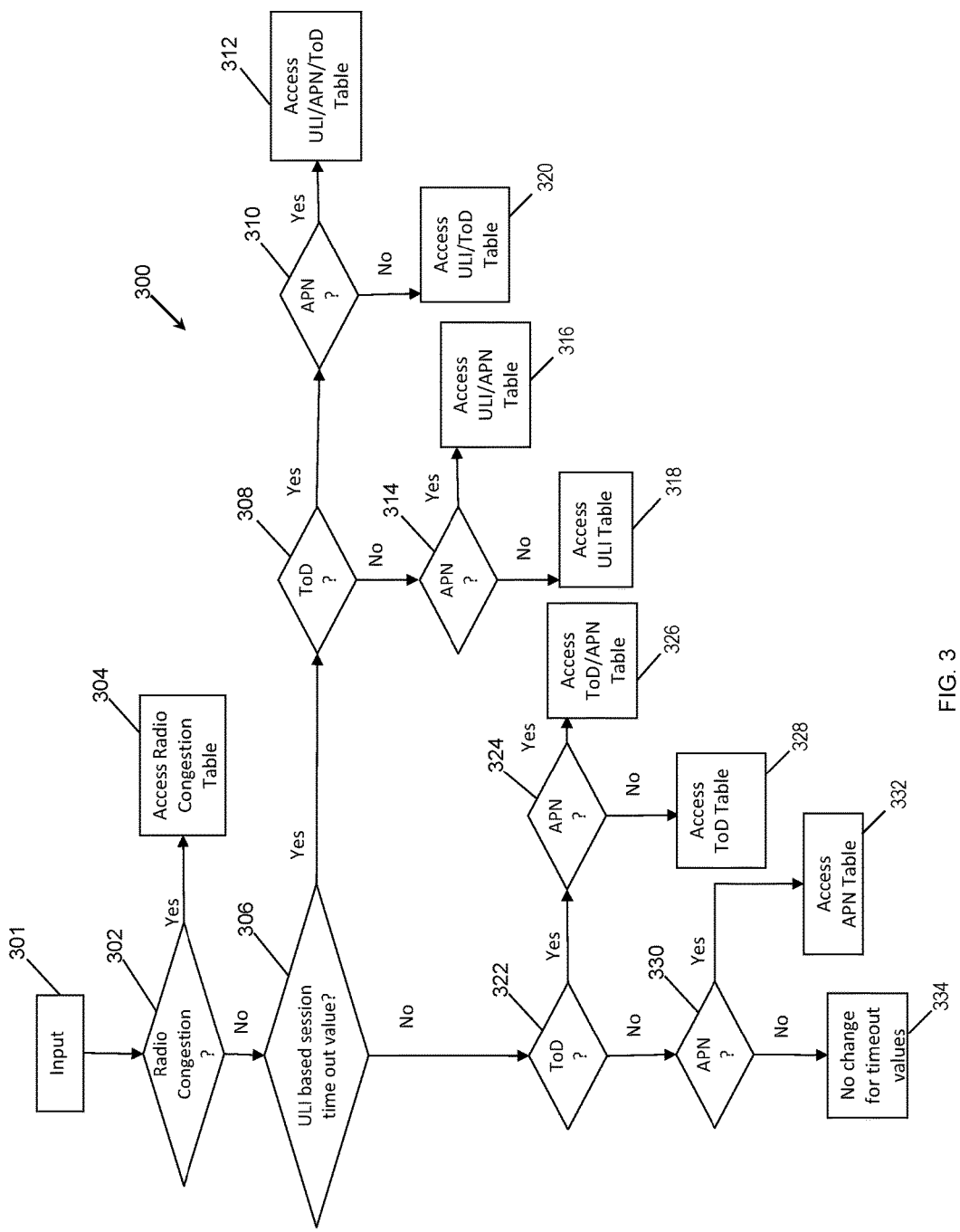
FIG. 3 is a flow diagram depicting a flow diagram for determining timeout period values based on a number of exemplary session information parameter inputs in accordance to an embodiment of the subject matter described herein.

FIG. 3 is a flow diagram illustrating a process for determining timeout period values based on a number of exemplary session information parameter inputs in accordance to an embodiment of the subject matter described herein. In response to receiving the Diameter protocol request message from the PCEF and/or TP manager 122 hosted by PGW 114, PCRF 110 is configured to extract the session information parameters contained in the request message. After the session information parameters are extracted, TPVD engine 124 is configured to utilize the session information parameters as input for the process in order to derive the absolute and idle timeout period values. In some embodiments, process may be exemplary algorithm 300 that is configured to derive timeout period values and is supported/executed by TPVD engine 124. TPVD engine 124 may also include the PCRF's local configuration that defines the criteria (i.e., the specific session information parameters) that is to be used as input for algorithm 300. For example, the local configuration may specify that one or more of radio network congestion information, ULI information, ToD information, RAT type information, or APN information is to be accounted for by TPVD engine to execute algorithm 300.

Referring to FIG. 3, TPVD engine 124 initially parses the input 301 to determine if there is a network congestion parameter that serves as an indication of radio traffic congestion (block 302). Such information is typically provided by an RCAF to the PCRF via an Np interface message. In the event TPVD engine 124 determines that radio traffic congestion is to be considered, algorithm 300 continues to block 304 where TPVD engine 124 is configured to reference a congestion table. An example congestion table 401 is depicted in FIG. 4A. Although table 401 only depicts five entries for the sake of illustration, the congestion table accessed by TPVD engine 124 may include any number of entries without departing from the scope of the disclosed subject matter. In FIG. 4A, congestion table 401 may include a multi-entry table that provides a mapping between a congestion level column and a corresponding timeout period values column that contains the absolute and idle timeout period values. In some embodiments, the timeout period values maybe characterized by very small granularity (e.g., a few seconds or microseconds). As an example, the fourth entry in congestion table 401 indicates that an absolute timeout value of 120 seconds and a 60 second idle timeout value are mapped to a radio network congestion level equal to "4 (High Medium)". Notably, in the event an Np interface message received by PCRF 110 from a RCAF includes a radio congestion parameter equal to "4", then TPVD engine 124 decides that an absolute value of 120 seconds and an idle timeout value of 60 seconds are to be applied to the session being requested by the user equipment device at the PGW.

If there is no radio congestion parameter detected in block 302 (e.g., a CCR message is received), TPVD engine 124 is configured to determine whether algorithm 300 is to use or account for a user location information (ULI) parameter provided in the input (block 306). If a ULI parameter is to be considered, then TPVD engine 124 is configured to determine whether a time a day (ToD) parameter is also to be considered for the determination of the timeout period values (block 308). If TPVD engine 124 determines that a ToD parameter is to be used, then TPVD engine 124 further determines whether APN information is to be considered for the determination of the timeout period values (block 310). If APN information is also to be considered, then TPVD engine 124 proceeds to utilize a ULI/APN/ToD table 402. Otherwise, engine 124 only needs to reference a ULI/ToD table 403. An example ULI/APN/ToD table 402 and ULI/ToD table 403 are depicted in FIG. 4A. Although each of tables 402 and 403 only depicts five entries for the sake of illustration, these tables accessed by TPVD engine 124 may include any number of entries without departing from the scope of the disclosed subject matter. In FIG. 4A, ULI/APN/ToD table 402 may include a multi-entry table that provides a mapping among a ULI column, APN column, ToD column, and a corresponding timeout period values column that contains the absolute and idle timeout period values. Similarly, ULI/ToD table 403 may include a multi-entry table that provides a mapping among a ULI column, ToD column, and a corresponding timeout period values column that contains the absolute and idle timeout period values.

Returning to block 308, in the event the TPVD engine 124 determines that ToD parameter is not be used, then TPVD engine 124 further determines whether APN information is to be considered for the determination of the timeout period values (block 314). If APN information is also to be considered, then TPVD engine 124 proceeds to utilize a ULI/APN table 404. If APN information is determined not be considered, then TPVD engine 124 proceeds to block 318 to utilize a ULI table 408. An example ULI/APN table 404 is depicted in FIG. 4A and an example ULI table 408 is depicted in FIG. 4B. Although each of tables 404 and 408 only depicts five entries for the sake of illustration, these tables accessed by TPVD engine 124 may include any number of entries without departing from the scope of the disclosed subject matter. In FIG. 4A, ULI/APN table 404 may include a multi-entry table that provides a mapping among a ULI column, APN column, and a corresponding timeout period values column that contains the absolute and idle timeout period values. Similarly, ULI table 408 in FIG. 4B may include a multi-entry table that provides a mapping between a ULI column and a corresponding timeout period values column that contains the absolute and idle timeout period values.

Returning to block 306, in the event the TPVD engine 124 determines that ULI parameter is not be used, then TPVD engine 124 determines whether ToD information is to be considered for the determination of the timeout period values (block 322). If so, then TPVD engine 124 further determines whether APN information is to be considered for the determination of the timeout period values (block 324). If APN information is also to be considered, then TPVD engine 124 proceeds to block 326 to utilize a ToD/APN table 405. If APN information is determined not be considered at block 324, then TPVD engine 124 proceeds to utilize a ToD table 406. An example ToD/APN table 405 is depicted in FIG. 4A and an example ToD table 406 is depicted in FIG. 4B. Although each of tables 405 and 406 only depicts five entries for the sake of illustration, these tables accessed by TPVD engine 124 may include any number of entries without departing from the scope of the disclosed subject matter. In FIG. 4A, ToD/APN table 405 may include a multi-entry table that provides a mapping among a ToD column, APN column, and a corresponding timeout period values column that contains the absolute and idle timeout period values. Similarly, ToD table 406 in FIG. 4B may include a multi-entry table that provides a mapping between a ToD column and a corresponding timeout period values column that contains the absolute and idle timeout period values. Alternatively, TPVD engine 124 may be configured to access ToD table 407 (as depicted in FIG. 4B) instead of table 406. Notably, ToD table 407 include a multi-entry table that provides a mapping between a ToD slot column that includes multiple ToD ranges or "slots", and a corresponding timeout period values column that contains the absolute and idle timeout period values.

If at block 322 the TPVD engine 124 determines that ToD information is not be used, then TPVD engine 124 determines whether APN information is to be considered for the determination of the timeout period values (block 330). If so, then TPVD engine 124 proceeds to block 332 to utilize an APN table 409. For example, APN table 409 in FIG. 4B may include a multi-entry table that provides a mapping between an APN column and a corresponding timeout period values column that contains the absolute and idle timeout period values. If APN information is determined not be considered at block 330, then TPVD engine 124 proceeds to block 332 and determines that the existing timeout period values are not to be changed (e.g., at the PGW).

In each of the instances where TPVD engine 124 accesses any one of tables 401-409, TPVD engine 124 may be configured to cross-reference the session information parameters that are designated as input to the entries of the accessed table. Upon determining a match between the session parameter values and the values (or ranges) of the table entries, TPVD engine 124 may obtain the corresponding absolute and idle timeout period values contained in the matching entry. TPVD engine 124 and/or PCRF 110 may then be configured to generate and send a Diameter response message (e.g., a CCA-I) that contains the absolute and idle timeout period values to PGW 114.

Figure 5:
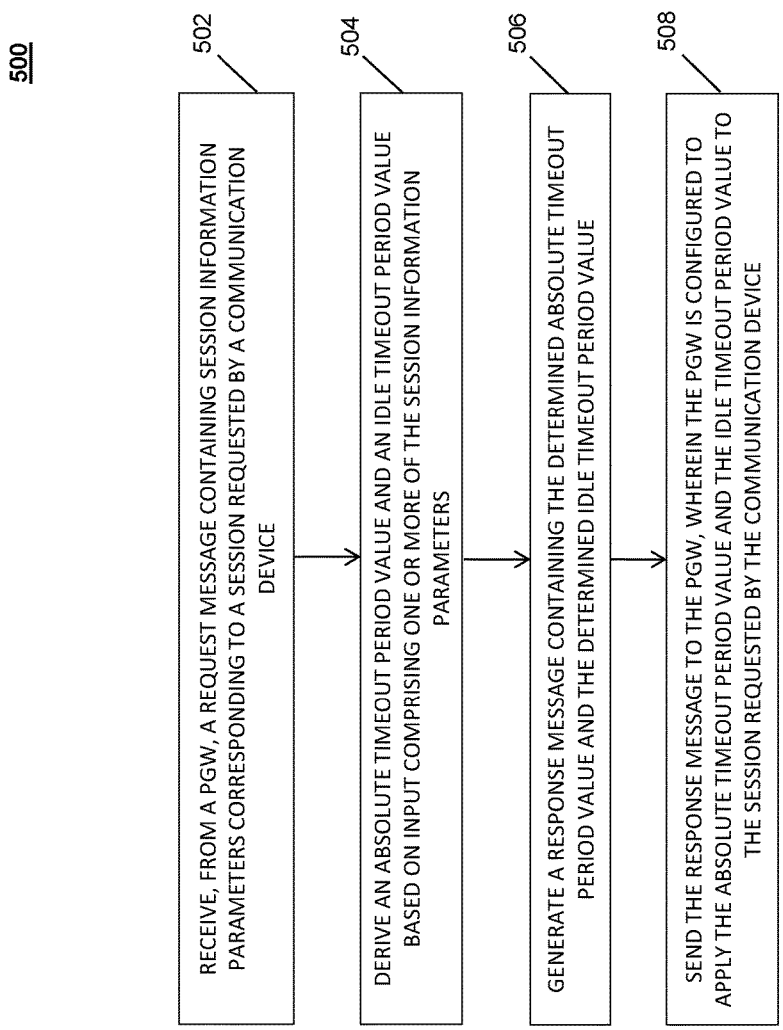
FIG. 5 depicts an example process for dynamically provisioning session timeout information in a communications network in accordance to an embodiment of the subject matter described herein.

FIG. 5 depicts an example method for dynamically provisioning session timeout information in a communications network in accordance to an embodiment of the subject matter described herein. In some embodiments, example method 500 described herein, or portions thereof, may be performed at or performed by PGW 114, TP manager 122, PCRF 110, TPVD engine 124, and/or another module or node. For example, method 500 may be an algorithm that is stored in memory and executed by a processor within one or more of these aforementioned network components.

In some embodiments, a PGW may first be contacted to assist with facilitating the attachment of user equipment to a packet network. For example, a user equipment device may communicate a session setup request message (i.e., an attach request message) via an eNodeB to an MME, which in turn determines the appropriate SGW and PGW to establish the subscriber session. The MME subsequently generates and directs a create session request message to the designated PGW. Notably, the create session request message received by the PGW includes various session information parameters, such the user location information, an APN identifier, time of day information, RAT type information corresponding to the requesting user equipment device, and the like. In some embodiments, the create session request message received by the PGW may include parameters such as an IMSI, MSISDN, APN, RAT type, ECGI user location information, user equipment time zone information, and the like. In response to receiving the create session request message, a PCEF (and/or TP manager hosted by the PGW) attempts to communicate with a PCRF. In some embodiments, the PGW generates and sends a Diameter based request message (e.g., a CCR message) to the PCRF to provide the session information parameters that will be used to derive the absolute and idle timeout period values.

In particular, method 500 as illustrated in FIG. 5 depicts exemplary steps conducted by the receiving PCRF (and/or its hosted TPVD engine) to dynamically provision session timeout information in a communications network in response to the receipt of the create session request message from the PGW. For example, referring to method 500, in step 502, the request message containing session information parameters corresponding to a session requested by a user equipment device is received. In some embodiments, the PCRF is further configured to extract the session information parameters contained in the request message. In some embodiments, the session information parameters contained in the request message includes one or more of: a RAT type of the requesting user equipment device, the ToD information, user location information, and APN identifier information. In an alternate embodiment, the PCRF is configured to receive radio user plane congestion information from an RCAF via an Np interface message.

In step 504, an absolute timeout period value and an idle timeout period value based on input comprising one or more of the session information parameters are derived. In some embodiments, the PCRF and/or TPVD engine uses the session information parameters received from the PGW as input. For example, TPVD engine may execute the algorithm described in FIG. 3 using the session information parameters as input in accordance to its local configuration. Alternatively, the PCRF and/or TPVD engine the PCRF may utilize the radio user plane congestion information received from a RCAF node via an Np interface as input for the algorithm described in FIG. 3. After the input is applied, the TPVD engine is configured to derive the absolute timeout period value and an idle timeout period value for the requested session.

In step 506, a response message containing the determined absolute timeout period value and the determined idle timeout period value is generated. In some embodiments, the TPVD engine in the PCRF generates a Diameter protocol response message, such as a CCA message, that includes the absolute and idle timeout period values.

In step 508, the response message is sent to the PGW. In some embodiments, the TPVD engine and/or the host PCRF sends the Diameter response message containing the absolute and idle timeout period values to the PGW. After receiving the timeout period values, the TP manager hosted by the PGW is configured to apply the absolute timeout period value and the idle timeout period value to the session requested by the user equipment device. Once provisioned with the new timeout period values, the PGW and/or TP manager is configured to delete the data session in the event the user equipment ceases to communicate any messages for the duration of the idle timeout period, or if the total session time exceeds that absolute timeout period. In some embodiments, the PGW may also be configured to provide the timeout period values to the user equipment device.

In some embodiments, the disclosed subject matter further comprises generating, by the PGW, a create session response message including at least the absolute timeout period value and the idle timeout period value.

In some embodiments, the disclosed subject matter further comprises sending, by the PGW, the create session response message containing the absolute timeout period value and the idle timeout period value to the user equipment device.

In some embodiments, the disclosed subject matter further comprises the user equipment device utilizing the absolute timeout period value and the idle timeout period value to establish a data rate for sending uplink data for the session.

In some embodiments, the disclosed subject matter further comprises a system and method wherein the session information parameters include at least one of a congestion indication parameter, a user location information parameter, a time of day parameter, or an access point name (APN) parameter.

In some embodiments, the disclosed subject matter further comprises determining the absolute timeout period value and the idle timeout period value by matching the one or more session information parameters to one or more threshold values that are mapped to absolute timeout period values and idle timeout period values stored in a database table.

In some embodiments, the disclosed subject matter further comprises a system and method wherein the user equipment device includes a wireless mobile device, an Internet of things (IoT) device, or a machine-to-machine (M2M) device.

It should be noted that PGW 114, timeout period manager 122, PCRF 110, TPVD engine 124, and/or functionality described herein may constitute a special purpose computing device. Further, PGW 114, timeout period manager 122, PCRF 110, TPVD engine 124, and/or functionality described herein can improve the technological field of network communications. For example, the disclosed subject matter affords the technical advantage of dynamically adjusting and provisioning session timeout information associated with data sessions between a user equipment device and an application server. By dynamically adjusting the timeout period values associated with a particular session (on a per subscriber basis), the disclosed subject matter affords the technical advantages of reducing unnecessary allocation of valuable resources to sessions that are likely unused. More specifically, the disclosed subject matter aims to help efficient management of network resources. The existing mechanism of static timeout configuration for a given APN at a PGW can be improved by configuring the PCRF to dynamically derive an absolute timeout period value and an idle timeout period value for different priority sessions. Benefits arising from such a mechanism include controlling the time taken for an IoT device or M2M device to transfer data such that network resources are prevented from continuing to support data sessions where a malfunction has occurred.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for dynamically provisioning subscriber based session timeout information, comprising:
   receiving, from a packet data network gateway (PGW), a request message containing session information parameters corresponding to a session requested by a user equipment device;
   determining an absolute timeout period value and an idle timeout period value based on input comprising one or more of the session information parameters, wherein determining the absolute timeout period value and the idle timeout period value includes matching one or more of the session information parameters to one or more threshold values that are mapped to absolute timeout period values and idle timeout period values stored in a database table;
   generating a response message containing the determined absolute timeout period value and the determined idle timeout period value; and
   sending the generated response message to the PGW, wherein the PGW is configured to apply the absolute timeout period value and the idle timeout period value to the session requested by the user equipment device.

2. The method of claim 1 comprising generating, by the PGW, a create session response message including at least the absolute timeout period value and the idle timeout period value.

3. The method of claim 2 comprising sending, by the PGW, the create session response message containing the absolute timeout period value and the idle timeout period value to the user equipment device.

4. The method of claim 3 wherein the user equipment device utilizes the absolute timeout period value and the idle timeout period value to establish a data rate for sending uplink data for the session.

5. The method of claim 1 wherein the session information parameters include at least one of a congestion indication parameter, a user location information parameter, a time of day parameter, or an access point name (APN) parameter.

6. The method of claim 1 wherein the user equipment device includes a wireless mobile device, an Internet of things (IoT) device, or a machine-to-machine (M2M) device.

7. A system for dynamically provisioning subscriber based session timeout information, comprising:
a policy and charging rules function (PCRF) node comprising at least one processor, a memory, and a timeout period value determination (TPVD) engine stored in the memory and when executed by the at least one processor of the PCRF is configured to receive a request message containing session information parameters corresponding to a session requested by a user equipment device, determine an absolute timeout period value and an idle timeout period value based on input comprising one or more of the session information parameters, generate a response message containing the determined absolute timeout period value and the determined idle timeout period value, wherein the PCRF is further configured to determine the absolute timeout period value and the idle timeout period value by matching one or more of the session information parameters to one or more threshold values that are mapped to absolute timeout period values and idle timeout period values stored in a database table; and
a packet data network gateway (PGW) comprising at least one processor, a memory, and a timeout parameter manager stored in the memory and when executed by the at least one processor of the PGW is configured to receive, from the PCRF, the generated response message containing the determined absolute timeout period value and the determined idle timeout period value and to apply the absolute timeout period value and the idle timeout period value to the session requested by the user equipment device.

8. The system of claim 7 wherein the PGW is further configured to generate a create session response message including at least the absolute timeout period value and the idle timeout period value.

9. The system of claim 8 wherein the PGW is further configured to send the create session response message containing the absolute timeout period value and the idle timeout period value to the user equipment device.

10. The system of claim 9 wherein the user equipment device utilizes the absolute timeout period value and the idle timeout period value to establish a data rate for sending uplink data for the session.

11. The system of claim 7 wherein the session information parameters include at least one of a congestion indication parameter, a user location information parameter, a time of day parameter, or an access point name (APN) parameter.

12. The system of claim 7 wherein the user equipment device includes a wireless mobile device, an Internet of things (IoT) device, or a machine-to-machine (M2M) device.

13. A non-transitory computer readable medium comprising computer executable instructions embodied in the non-transitory computer readable medium that when executed by at least one processor of at least one computer cause the at least one computer to perform steps comprising:
receiving, from a packet data network gateway (PGW), a request message containing session information parameters corresponding to a session requested by a user equipment device;
determining an absolute timeout period value and an idle timeout period value based on input comprising one or more of the session information parameters, wherein determining the absolute timeout period value and the idle timeout period value includes matching one or more of the session information parameters to one or more threshold values that are mapped to absolute timeout period values and idle timeout period values stored in a database table;
generating a response message containing the determined absolute timeout period value and the determined idle timeout period value; and
sending the generated response message to the PGW, wherein the PGW is configured to apply the absolute timeout period value and the idle timeout period value to the session requested by the user equipment device.

14. The non-transitory computer readable medium of claim 13 comprising generating, by the PGW, a create session response message including at least the absolute timeout period value and the idle timeout period value.

15. The non-transitory computer readable medium of claim 14 comprising sending, by the PGW, the create session response message containing the absolute timeout period value and the idle timeout period value to the user equipment device.

16. The non-transitory computer readable medium of claim 15 wherein the user equipment device utilizes the absolute timeout period value and the idle timeout period value to establish a data rate for sending uplink data for the session.

17. The non-transitory computer readable medium of claim 13 wherein the session information parameters include at least one of a congestion indication parameter, a user location information parameter, a time of day parameter, or an access point name (APN) parameter.

* * * * *

UNITED STATES PATENT AND TRADEMARK OFFICE
CERTIFICATE OF CORRECTION

PATENT NO. : 10,448,449 B2
APPLICATION NO. : 15/649627
DATED : October 15, 2019
INVENTOR(S) : Aravamudhan et al.

Page 1 of 1

It is certified that error appears in the above-identified patent and that said Letters Patent is hereby corrected as shown below:

On the Title Page

Column 2, under Abstract, Lines 3-4, delete "method includes method includes" and insert -- method includes --, therefor.

On page 2, Column 2, under Other Publications, Line 71, delete "Commumcation" and insert -- Communication --, therefor.

On page 3, Column 2, under Other Publications, Line 31, delete "Applicatons" and insert -- Applications --, therefor.

On page 3, Column 2, under Other Publications, Line 43, delete "2018)." and insert -- 2019). --, therefor.

Signed and Sealed this
Thirteenth Day of October, 2020

Andrei Iancu
*Director of the United States Patent and Trademark Office*